April 30, 1957 R. G. PRIEST 2,790,622
PORTABLE LOGGING TOWER
Filed Sept. 15, 1953 5 Sheets-Sheet 1
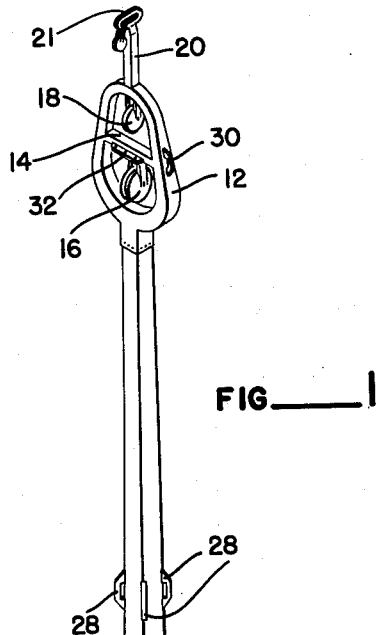
FIG—1
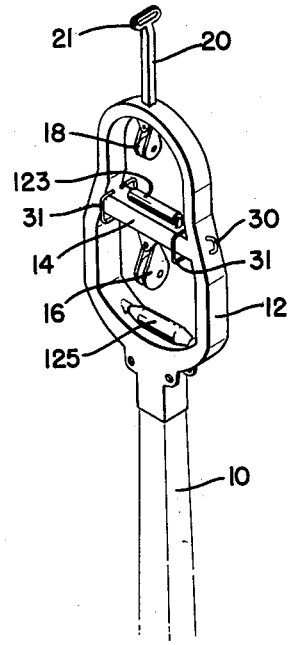
FIG—9
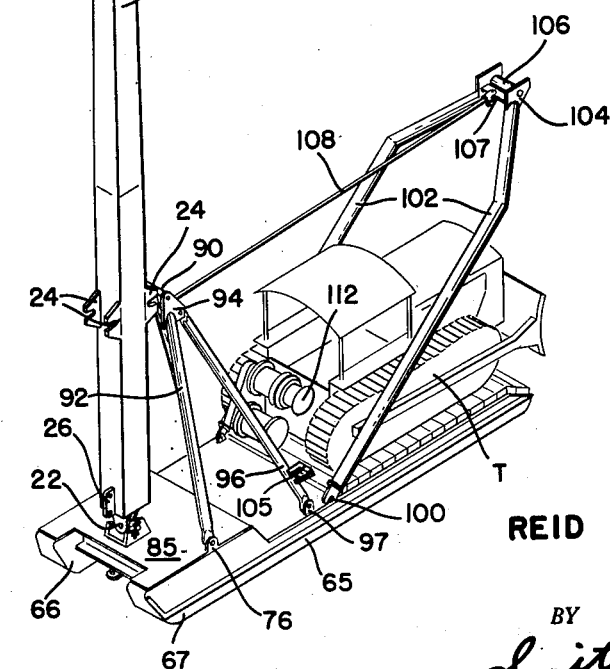
REID G. PRIEST
INVENTOR.
BY
Smith & Tuck

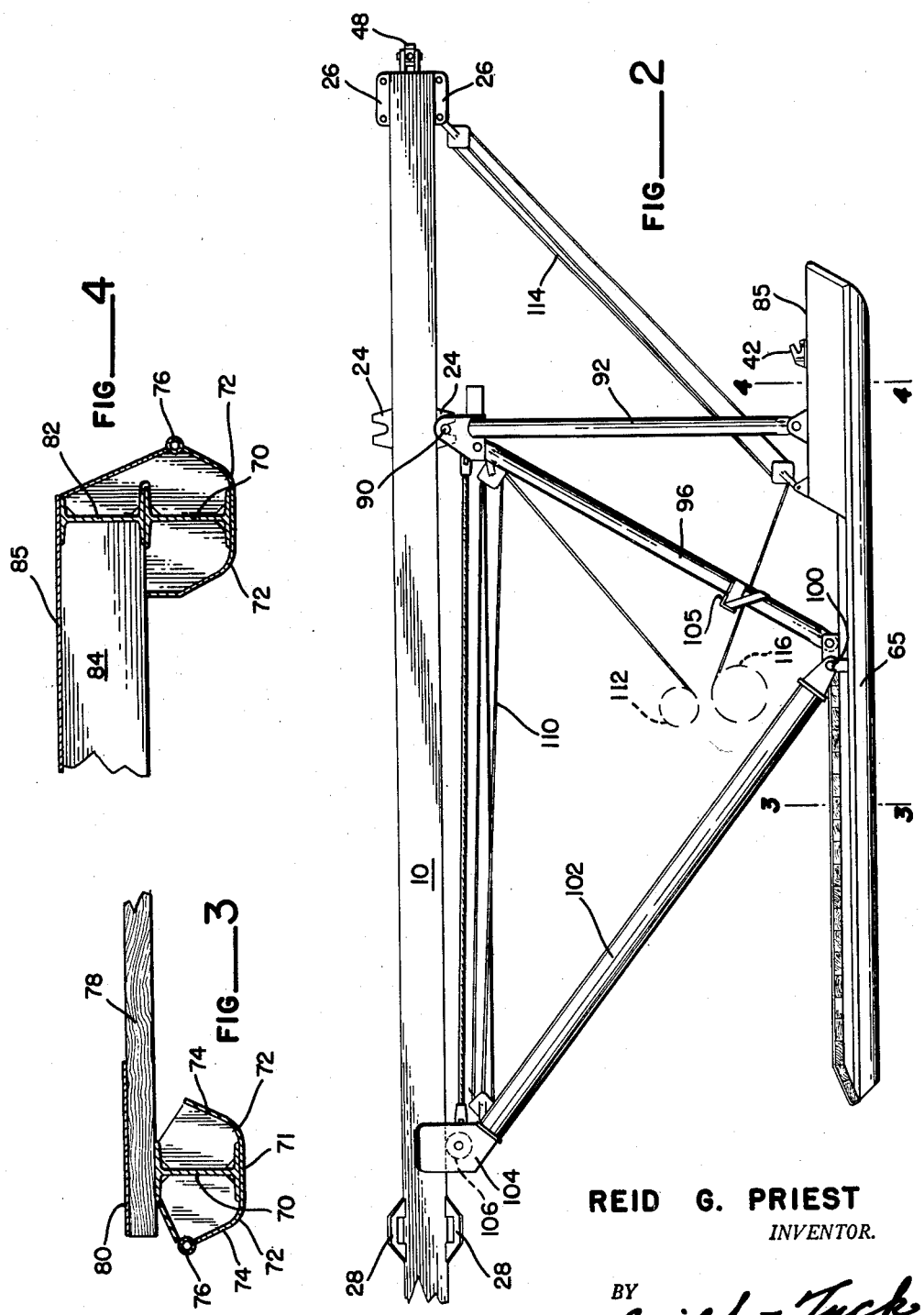

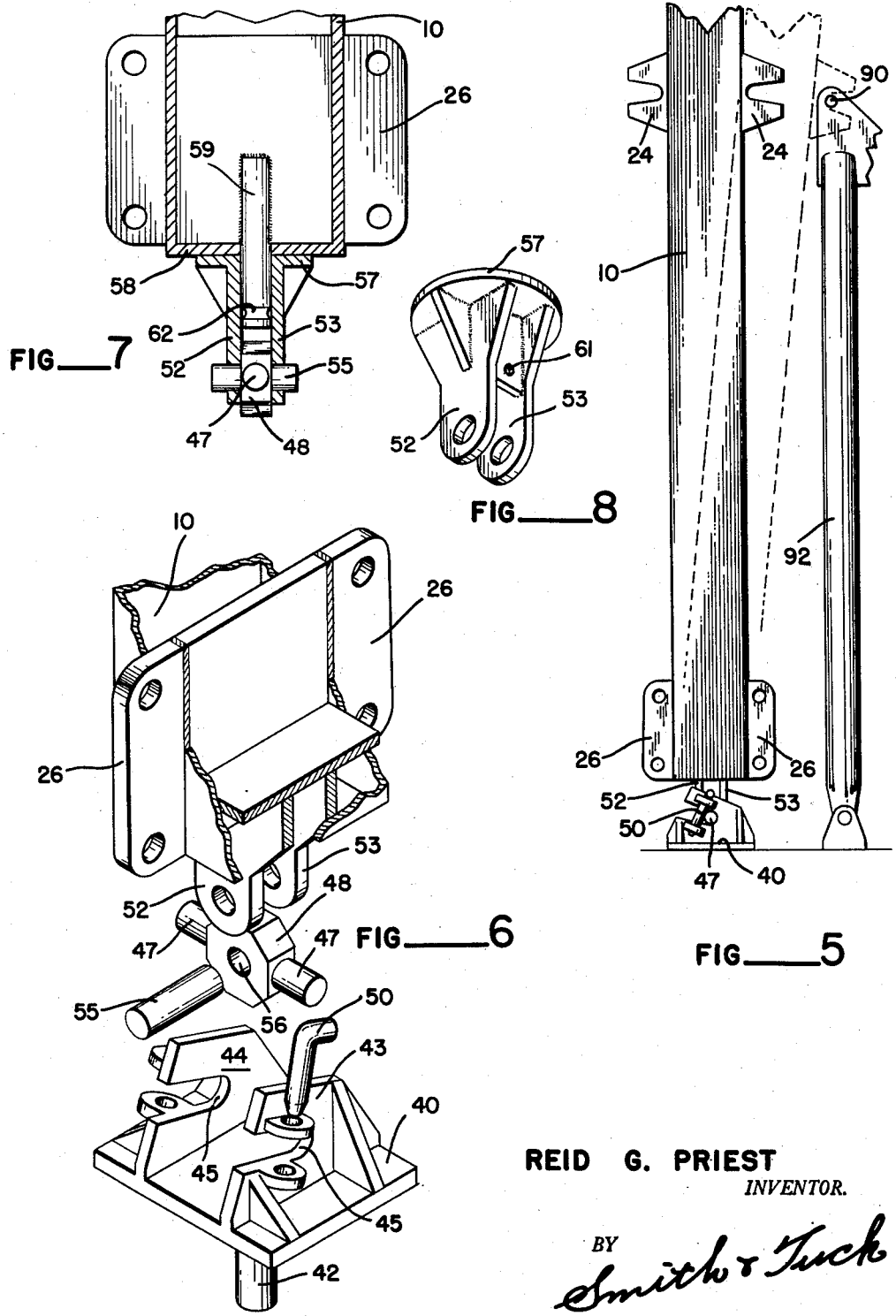

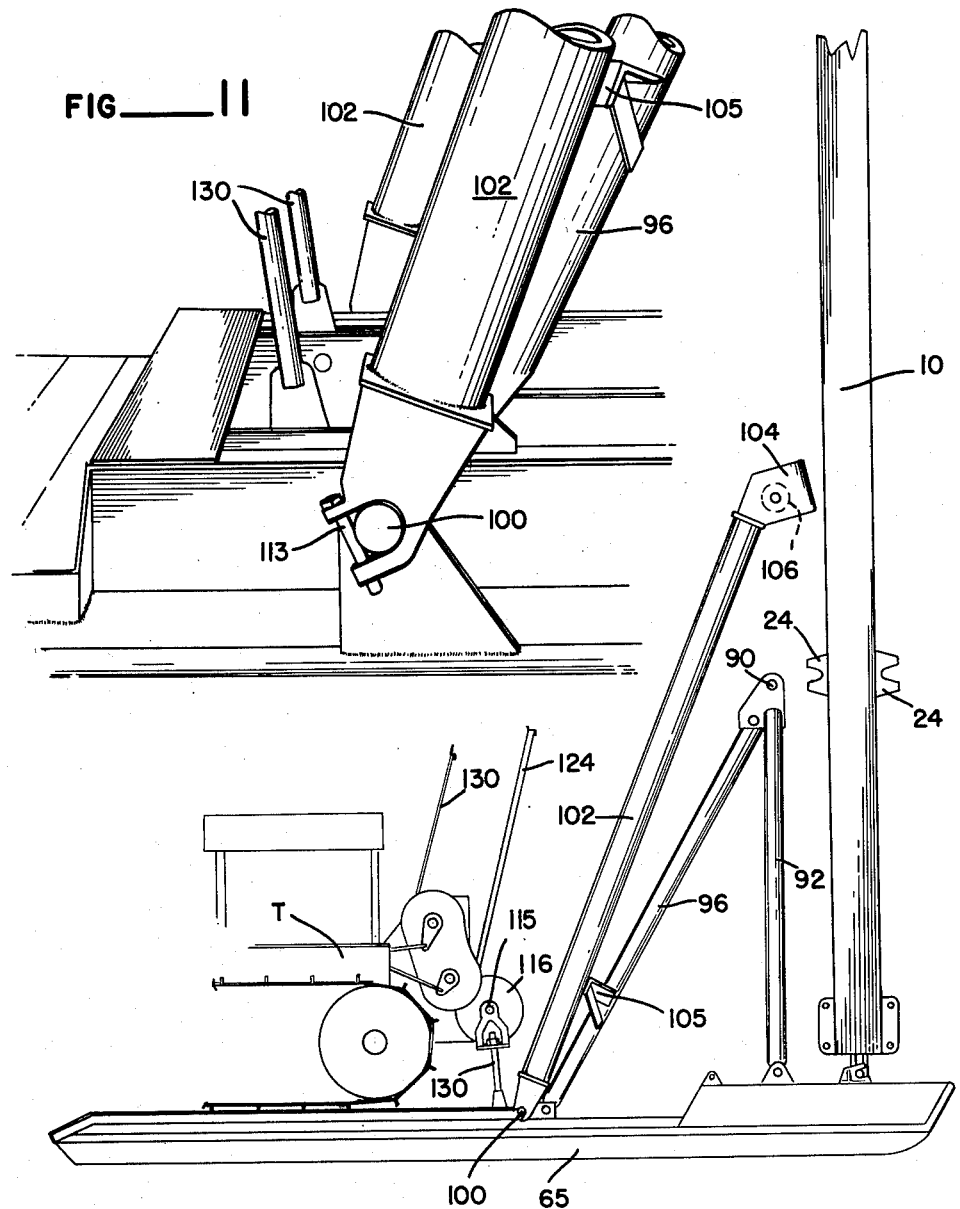

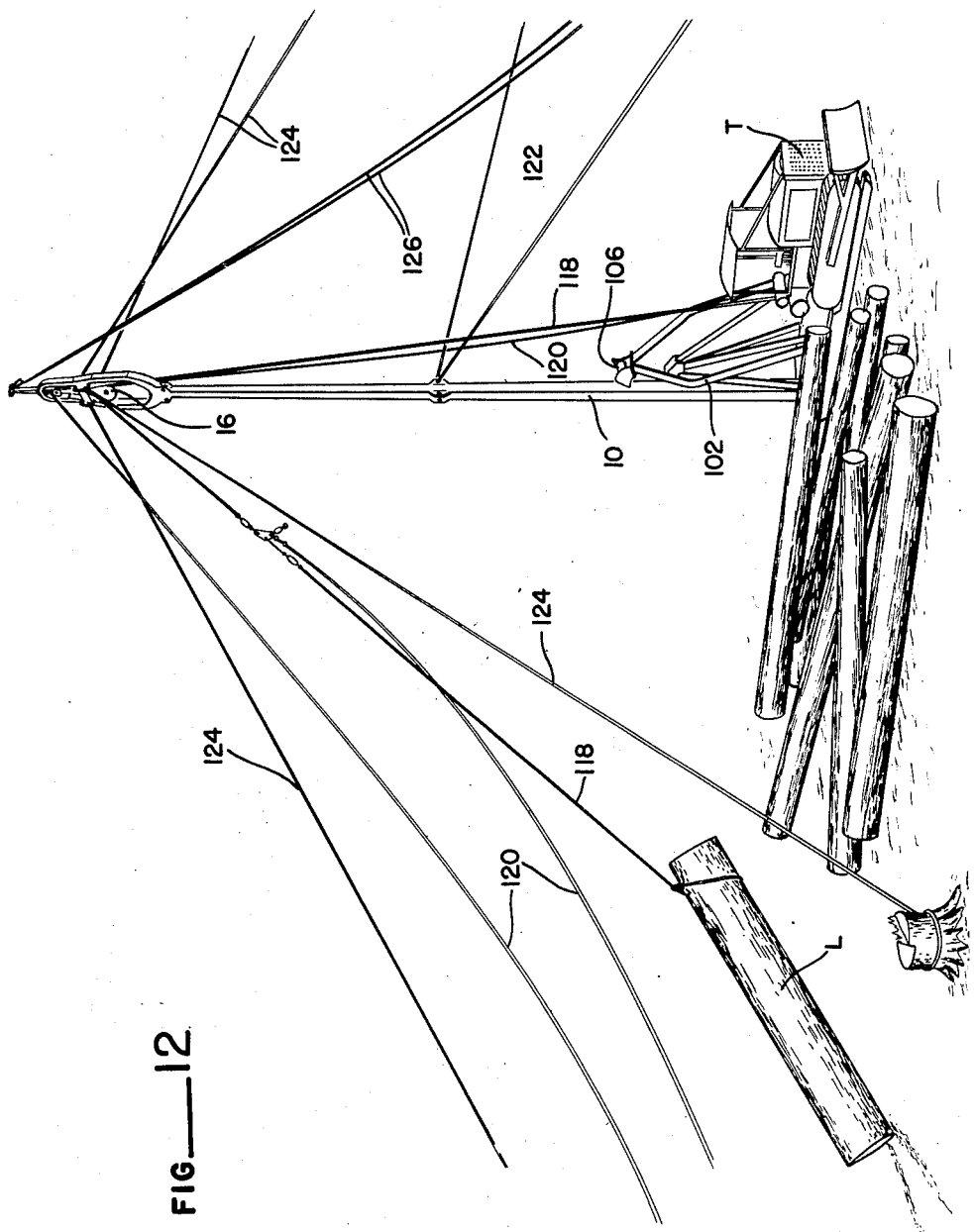

United States Patent Office 2,790,622
Patented Apr. 30, 1957

2,790,622

PORTABLE LOGGING TOWER

Reid G. Priest, Port Angeles, Wash.

Application September 15, 1953, Serial No. 380,330

7 Claims. (Cl. 254—139.1)

This present invention relates to the general art of power-logging equipment and more particularly to a logging tower which is portable and takes the place of the spar trees formerly used in the logging of heavy timber. This tower consists of a tall, wooden, or preferably steel spar member. The base of the spar is adapted to rest in a gimbal mounting which in turn is secured to a substantial sled. The sled member is normally provided with a platform so that a bulldozer can be backed up on the same and the plurality of drums with which the logging bulldozers or tractors are equipped provides the cable power input to the logging plant. Provision is made for lowering the spar, which is normally positioned in a more or less vertical position by a plurality of guys, onto a travelling rest or carriage arrangement secured to the sled to the end that, when moving from one logging location to another, the tractor can haul the sled with the spar in a horizontal position on the same. Means are further provided for raising the spar and holding it in position until the necessary guys are rigged and secured, after which time the only connection between the spar and the sled assembly is through means of the gimbal joint rest member.

In logging heavy timber, particularly of the type found on the Pacific coast, where the trees grow to enormous size, many different arrangements have been employed to handle the very heavy logs produced from these large trees. The equipment has followed a natural evolution from the older methods where tremendously powerful steam donkeys were employed through the various stages of tight and slackline operations until the coming into general use of the powerful diesel tractors of the tracklaying type. Logging conditions have changed somewhat too in that more generally the logging is confined to small areas which make the use of the ponderously heavy former equipment both clumsy and expensive. In this present invention a need has been supplied in having a portable tower and logging gear that can be easily moved from point to point so that the logs need not be handled over long distances as was formerly the case. It has now become common to place the spar and its associated equipment at a convenient point and log the trees within a reasonable cable length and then load the logs on trucks and trailers for their transportation to a point of use. This present equipment makes it possible to move from one location to another with a minimum loss of time. This therefore fits into the present day plan in that frequent moves can be made and thus the logging can be handled in the most expeditious and economical manner.

In the older forms of logging where spar trees were used, the preparation of a tree for use as a spar, which included the topping of the same, and the severing of the limbs therefrom, was both a hazardous operation and a time-consuming one. This present equipment, with the ability to revolve the spar to more readily adapt it to changing the angular position of the logs, is a very pronounced forward step from the old spar tree arrangement. Of necessity the equipment must be capable of handling the logs as they come, and some of them are of very large proportions, about six to eight feet in diameter being not uncommon. It therefore follows that this equipment must be very sturdily constructed, which would have required tremendous members if they were to be made of wood. However, with the advancement in welding and the like, it has been found possible to employ tubular sections and box sections built up by welding so that the required strength can be obtained an still keep the weight of the entire assembly within the capacity of a single tractor to move it from point to point. This is a very important consideration in this operation.

Further objects, advantages and capabilities will be apparent from the description and disclosure in the drawings, or may be comprehended or are inherent in the device.

In the drawings:

Figure 1 is a perspective view showing the general arrangement and approximate proportions of parts in one workable embodiment of this invention;

Figure 2 is a side elevation of the portable logging equipment showing the spar in its horizontal or travelling positions with one end of the same broken away;

Figure 3 is a cross-sectional view along the line 3—3 of Figure 2;

Figure 4 is a cross-sectional view along the line 4—4 of Figure 2;

Figure 5 is a fragmentary, vertical view showing the spar and the upper fulcrum arrangement employed in raising or lowering this spar, certain parts broken away, and an intermediate position of the spar is shown in dashed lines;

Figure 6 is an exploded perspective view showing the pivot member for the lower end of the spar, showing the various elements making up the gimbal arrangement and showing the spar broken away in sections;

Figure 7 is a vertical sectional view illustrating a modified form of spar pivot which permits lowering the spar in either of two positions;

Figure 8 is a perspective view showing a modified bearing plate for use with the spar pivot of Figure 7;

Figure 9 illustrates a modified form of spar top which is especially desirable in certain operations;

Figure 10 illustrates certain parts, on an increased scale, to more fully disclose the construction;

Figure 11 is a fragmentary detail view illustrating the pivot assembly used on the rest support members;

Figure 12 is a perspective view illustrating this equipment in use.

Referring more particularly to the disclosure in the drawings, the numeral 10 generally designates the spar member. This member may be made in various forms—the presently preferred type is to make the spar of two deep channels formed from steel plate and to weld the same along their abutting edges. This construction makes it convenient to form the spar with rounded corners and admits of adequate reinforcement of the corners by welding inserts in the inside corners. Such an arrangement makes it convenient to taper the spar in keeping with the load handling characteristics required. Spars may be of varying sizes. However, in the form illustrated throughout the accompanying drawings, the overall length is approximately 75 feet, which has proven a very satisfactory length.

At its upper end spar 10 is provided with the block tower arrangement 12. This member, which is again fabricated from steel, is formed generally in the form of a truncated triangle which is divided by the main block support member 14 which provides an anchor for block 16. Above member 14 space is provided for the secondary block 18. An upward extension 20 of tower 12 provides the slotted block anchor member 21.

At its lower end, spar 10 is provided with a gimbal or universal action joint and support member indicated generally at 22. This member is more fully illustrated in Figure 6 and in modified form in Figures 7 and 8. Secured at various points of the spar are other fittings having specific uses. At 24 are provided two sets of co-acting trunnion bearing members which are used in raising or lowering the spar and one of the sets, as selected, provides a rest for the mast during transportation. At its lower end, oppositely disposed pad eyes as 26 are provided, so that blocks may be engaged therein. Intermediate its ends, a plurality of guy anchor pads 28 are provided. These are for the securing of the main guy lines when the spar is in working position. Further, to meet the working needs, pads as 30 and pad eyes as 32 are provided so that adequate points of attachment will be provided for blocks, guy lines and the like, the arrangement of which is varied in accordance with the need of the moment, during use.

Referring more specifically to Figures 5 and 6, the operational arrangement and detailed showing of parts is made for the gimbal action, pivot, and heel-securing means. The base plate member 40 provides a bearing plate and this bearing plate is centered upon a downwardly-extending journal 42 which permits plate 40 to revolve about the bearing provided by journal 42 so that the spar may be faced in the optimum direction at all times. Base 40 has built-up bearing members 43 and 44. These two members are similar in that they have bearing portions 45. These bearings are adapted to receive bearings 47 of the hinge or universal block 48. Bearings 47 are held in their journals 45 by lock pins 50 which pass through outstanding pierced lugs secured in turn to brackets 42 and 43. It will be noted that the slotted bearings 45 are downwardly-pitched to the rear as viewed in Figure 5 so that little, if any, bearing pressure is exerted against pins 50.

The universal hinge block 48 is adapted for insertion between downwardly-extending lugs 52 and 53 and to be secured in operational relationship by hinge pins 55 which passes through bearing openings in lugs 52, 53, and a centrally disposed opening 56 in block 48. In its simplest form, spar 10 has its bottom, or lower end formed after the showing of Figure 5 in which bearings 52 and 53 are fixedly secured to spar 10. In some forms it is desirable that lugs 52 and 53 be disposed to pivot with respect to the longitudinal axis of spar 10 so that the spar may be lowered on either its front or rear side so as to make use of the two sets of bearing lugs 24. This modification is illustrated in Figures 7 and 8.

In this modified form lugs 52 and 53 are secured to a separate revolvable bearing member 57 which has a co-acting bearing plate 58 fixedly secured to spar 10. A short bearing shaft 59 is fixedly secured to spar 10, in axial alignment therewith. Shaft 59 is removably secured to the revolvable bearing plate, in which it may revolve, by a suitable pin passing through opening 61 in member 57 and engaging groove 62 cut on shaft 59. This permits lowering the mast through the use of either set of bearing lugs 24 without rearranging the spar supporting guys.

The base from which spar 10 is supported and which also becomes this transport carriage is the large sled 65. The sled in proper proportion to the 75 foot spar would normally have an overall length of approximately 30 feet and an overall width of approximately 9 feet. This gives an adequate base for the spar 10 and also for the tractor T after the showing of Figure 1. A sled of this order must be generously proportioned in order to provide the requisite strength to handle the stresses involved in an operation of this order. A desirable construction is shown in Figures 2, 3, and 4 in which it will be noted that the two spaced runners 66 and 67 are provided with preferably substantial I beams at 70 which extend longitudinally throughout the length of the runners. To beams 70 are secured the runners proper which again are preferably formed of steel plates after the general showing of Figures 3 and 4. It is to be noted that a flat bearing surface is provided at 71 and generous curves are provided as at 72 which merge the flat bottom with the sloping side 74. The upper margin of outer side 74 is preferably reinforced by a pipe or heavy tubing 76 extending along the length so as to stiffen this portion and prevent deformation of the same in handling.

The rear end of sled 65 is preferably decked over with heavy timber or planks 78 and this may be additionally protected by scuff plates 80. These timbers provide a resilient, grippable space for tractor T which normally sits on the same during the logging operation. The opposite or forward end of sled 65 requires considerable strength in order to support spar 10 and the stresses imposed upon the same by the strain imposed upon the various attachment points by the cable-directing blocks. A preferred structure is shown in Figure 4 in which super-imposed upon I beam 70 is a second I beam 82. This I beam has connected to it, a built-up girder section 84 and is provided with an upper steel deck 85. Such a structure provides easy mounting for the various attachments and bearing plates and further tends to distribute the heavy stresses occasionally placed upon the equipment throughout the whole structure.

Pivotably secured to the forward portion of sled 65 is the supporting means for the lower spar traveling support member 90. This member, in the form of a round shaft, is adapted to engage in the open bearings provided in lug 24 and is employed only in the transporting of the spar. A preferred arrangement is to have two opposed forward brace members 92 which are fixedly secured to the upper brackets 94 but pivotably secured as by bolting thereto to lugs secured to deck 85. This arrangement gives security to fitting 94 against any twisting action. Additional support however is required for bracket 94 and this is obtained by two oppositely-disposed rear brace members 96. These are preferably pivotally secured to lugs 97 which in turn are secured to sled 65. These pivoted connections for support or brace members 92 and 96 are not working pivots but are provided as an aid in the assembly of the equipment should it be desirable to take the equipment down for transportation on a highway. Normally the upward extent of the equipment is such that it would be difficult to transport on public roads as most highways have to a degree, limited vertical clearance at points.

Pivotally secured to sled 65 on the working pivots 100 are two similar co-acting opposed rest support members 102. These members are fixedly secured to bracket 104 which in turn supports a rest 106 adapted to engage spar 10 when the same is in the traveling position and also to provide the anchor bar 107 to which a tension member 108 is secured. It is to be noted that the sides of bracket 104 extend well upwardly above rest member 106. The function of this is to guide mast spar 10 and to prevent its lateral movement off of rest 106 during transportation of the equipment. Members 102 are generously proportioned. As will be noted from a study of Figure 1 they must be spread sufficiently so as to give ample clearance so that a large-sized tractor T may pass therethrough. The framework comprising the two arms 102 and the fitting 104 is disposed to actually pivot about pivots 100 and it is required to do so during the raising and lowering of the spar. This movement is effected by the compound tackle 110 having suitable blocks secured to fittings 94 and 104. The working end of the cable is lead to one of the drums as 112 of tractor T. Tackle 110 is normally rigged only at the time movement is anticipated and does not usually carry loads during the move as tension member 108, which is usually a heavy cable, is permanently attached and of ample size to easily carry the load imposed upon it. Member 108 definitely prevents arms 102 from being lowered farther than the adjustable position which is indicated at Figure 2. It is, however, flexible and in no way deters the raising of members 102, in the process of raising or lowering spar 10.

An enlarged detail of pivot 100 is shown in Figure 11 wherein a bearing member 115, fixedly secured to the lower ends of rests 102, suitably engages pivot pin 100 and is retained in position by lock bolts 113. This arrangement permits the dis-assembly of the bulky rest assembly as in transporting the same long distances.

In raising the spar, the rigging arrangement illustrated in Figure 2 is employed. The running lines from tackle 110 and 114 are taken in on drums 112 and 116, respectively. Tackle 114 tends to pull the lower end of the spar down whereas the taking in of tackle 110 raises the rest member 104 revolving arms 102 upon their pivots 100 and this tends to raise the upper portion of the spar. A completion of this action raises the spar until it is in the position shown in dashed lines in Figure 5. It is to be noted that in this position bearings 47 are engaged in the slotted retaining members and pins 50 are inserted to hold it in place. Thus the lower end of the spar is secured. Lugs 24 are in engagement with pivot pin 90 and are held in this position until suitable guys, secured as to pads 28, are in place and adjusted so as to bring spar 10 into the vertical position such as is illustrated in Figure 1 in which lugs 24 are withdrawn from engagement with pivot pin 90 and are out far enough from it so that it can be revolved upon pin 42 in its normal use. To lower the spar, a reversal of the operation essentially is followed in which the guy lines are suitably slacked off until the spar is in the inclined position shown in the dashed lines in Figure 5. The lowering of the spar is then under control of tackles 110 and 114. With this spar returned to the position shown in Figure 2, tractor T then has a balanced load on sled 65 and can easily transport it to a new location.

Figure 12 illustrates the manner of using this equipment and gives a better understanding of the enormous proportions of the spar and its associated parts. This mass is required as single logs weighing 15 to 20 tons, or even more, are not uncommon in the Pacific coast area. The log L is suitably secured to the main line 118 and the line passes through the main block 16 and then to the main drum on tractor T. The haulback line 120 is secured to the main line, goes out to an anchor in the cutting area, and then is returned to pass over block 18 and then down to a smaller drum on the tractor T. A plurality of intermediate guys 122 is secured to pads 28 on spar 10 and then led to suitable anchors. These guys are used as required. A plurality of upper guys 124 is secured to pads as 30, 31 or 32 in the spar top assembly, these are the lines which give main support to the spar and must be disposed radially to fully support and position the same. A rigging hoist 126 is normally attached to loop 21 on the tower top.

It will be noted that bracket 104 and roller 106 assist in raising the spar only to the inclined position shown in dashed lines in Figure 5. The guys are then employed to bring the spar to the vertical position and bracket 104 is then entirely out of contact with the spar while it is in use. Brackets 105 position arms 102 in their inoperative position.

Rollers as 123 and 125 are desirable to reduce friction and prevent undue wear in the cables and spar top.

To prevent the heavy strain placed upon main line 118 lifting the tractor up off sled 65, a plurality of hold-down devices 130 is employed. The preferred plan is to fixedly secure on end of the hold-down device to sled 65 and to attach the other end to the staff 115 of main line drum 116. Adjustable means are employed to tighten these devices.

When, in the claims, spar member 10 is said to have "a height comparable to that of the usual spar tree," this is taken to mean a length of approximately 75 to 90 feet. Any height shorter than that would not be very workable in most logging operations.

It is believed that it will be clearly apparent from the above description and the disclosure in the drawings that the invention comprehends a novel construction of a portable logging tower.

Having thus disclosed my invention, I claim:

1. A portable logging tower, comprising: an upright spar member having a height comparable to that of the usual spar tree, said spar member having means for securing guy lines thereto and having block means on its upper portion, a portable base on which the lower end of said spar member rests, a fixed fulcrum member positioned on said base and supported thereby in position to be engaged by said spar member at a point above the lower end of said spar member as it moves in an upright plane toward said base in lowering, a rest member having leg means pivotally connected to said base in a manner so that said rest member can pivot in said upright plane from a first position above said fulcrum member disposed to contact said spar member as it starts to lower to a second position horizontally removed from said fulcrum member, said base having power drum means and tension means connecting the lower end of the spar member to the drum means and connecting said rest member to said drum means in a manner so that a pulling force can be placed on the lower end of the spar member during raising and lowering and so that said rest member can be moved to support said spar member during raising and lowering.

2. A portable logging tower, comprising: an upright spar member having a height comparable to that of the usual spar tree, said spar member having means for securing guy lines thereto and having block means on its upper portion, a portable base adapted to rest on the ground and the lower end of said spar member being connected thereto by releasable means, said base having a platform and a tractor positioned on said platform, a fixed fulcrum member positioned between said tractor and said spar member and a series of legs supporting said fulcrum member in position to be engaged by said spar member above the lower end of said spar member as it moves in an upright plane toward said platform in lowering, a rest member having a pair of bowed legs straddling said tractor and pivotally secured to said base in a manner so that said rest member can pivot from a first position above said fulcrum member disposed to contact said spar member as it starts to lower to a second position horizontally removed from said fulcrum member and at approximately the same level so that said spar member can be supported by said fulcrum and rest members in transportation of said base, a tension link connecting said fulcrum and rest members preventing movement of said rest member farther away from said fulcrum member than said second position, said tractor having power drum means and tension means connecting said drum means to the lower end of said spar member and to said rest member disposed with mechanical advantage in a manner so that a pulling force can be placed on the lower end of the spar member during raising and lowering holding the spar member on the fulcrum member and so that said rest member can be moved to carry said spar member during raising and lowering.

3. A portable tower, comprising: an upright spar member and a portable base on which said spar member is secured by releasable means permitting lowering of said spar member, said releasable means including a pair of lugs depending from the lower end of said spar member having horizontally aligned openings therein, a universal block having a pair of horizontally aligned journals on two opposite sides and having a through opening extending normal to said journals and a pivot rod extending through said openings in said lugs and block, a support member having a depending rod and said base having an upright opening in which said depending rod is revolvably disposed and said base having a pair of spaced apart bearing members on its upper surface having a pair of matching slots horizontally aligned and open at one end and extending upwardly and to the side from the base of the slots to said open end and said journals being positioned in said slots with said universal block between said bearing members whereby downward pressure of said spar member tends to seat said journals in said slots, and removable means extending across the mouths of said slots for securing said journals in said slots.

4. The subject matter of claim 3 in which there is a plate revolvable about the longitudinal axis of said spar member interposed between said lugs and the lower portion of said spar member.

5. A portable logging tower, comprising: an upright metal spar member having a height comparable to that of the usual spar tree, said spar member having means for securing guy lines thereto, a portable base on which said spar member is secured by means permitting lowering of said spar member and permitting pivoting of said spar member about its longitudinal axis, and a block tower assembly on the upper end of said spar member including a fabricated metal frame generally in the shape of a truncated triangle divided by a horizontal main block support member, a main block secured to and depending from said main block support member, a secondary block secured to said frame above said main block support member, and an upstanding extension on top of said frame having a horizontally elongated slot on top to which a block can be secured on either side of the spar member.

6. A portable logging tower, comprising: an elongated portable base formed as a sled with a pair of spaced apart longitudinal runners forming the ground bearing supports for the base adapted to be towed in an end forward direction, a spar member having a height comparable to that of the usual spar tree having means for securing guy lines thereto and having block means on its upper portion, said base having a pair of raised longitudinally spaced apart support members located adjacent the ends of said base and supporting said spar member in substantially horizontal disposition without tipping the base when the spar member is lowered with the ends of said spar member overhanging the ends of said base, and one of said support members forming a fulcrum member on which said spar member is pivoted in raising and means for raising said spar member, the end of the spar member adjacent said fulcrum member being located to step onto the adjacent end of said base outside of said fulcrum member as it pivots to a raised position, said base having a platform on its end portion opposite said fulcrum member and a tractor positioned on said platform forming power means for the raising operation and the support member on the platform end of said base having supporting legs straddling said tractor and connected to said base.

7. A portable logging tower, comprising: an elongated portable base formed as a sled with a pair of spaced apart longitudinal runners forming the ground bearing supports for the base adapted to be towed in an end forward direction, a spar member having a height comparable to that of the usual spar tree having means for securing guy lines thereto and having block means on its upper portion, said base having a platform on one end portion and a tractor positioned on said platform, said base having a pair of raised longitudinally spaced apart support members located adjacent the ends of said base and supporting said spar member in substantially horizontal disposition without tipping the base when the spar member is lowered with the ends of said spar member overhanging the ends of said base, and one of said support members forming a fulcrum member on which said spar member is pivoted in raising without shifting the relative position assumed by the fulcrum member and spar member during transportation and means for raising said spar member including said tractor forming power means for the raising operation, said spar member and said fulcrum member having interengaging means preventing shifting of said spar member relative said fulcrum member during raising, and the end of the spar member adjacent said fulcrum member being located to step onto the adjacent end of said base outside of said fulcrum member as the spar approaches the raised position.

References Cited in the file of this patent

UNITED STATES PATENTS

| Number | Name | Date |
|---|---|---|
| 663,109 | Tucker | Dec. 4, 1900 |
| 1,280,951 | Blackmarr | Oct. 8, 1918 |
| 1,712,396 | Morris | May 7, 1929 |
| 1,917,666 | Russell | July 11, 1933 |
| 1,917,955 | Dierks | July 11, 1933 |
| 2,336,965 | Shoemaker | Dec. 14, 1943 |
| 2,451,223 | Johansen | Oct. 12, 1948 |
| 2,493,099 | Adams | Jan. 3, 1950 |
| 2,502,108 | Taylor | Mar. 28, 1950 |
| 2,607,500 | Frink | Aug. 19, 1952 |
| 2,616,666 | Honey | Nov. 4, 1952 |
| 2,687,810 | Hurst | Aug. 31, 1954 |
| 2,694,474 | Meany | Nov. 16, 1954 |

FOREIGN PATENTS

| Number | Country | Date |
|---|---|---|
| 313,883 | Great Britain | Dec. 19, 1929 |